United States Patent
Lu

(10) Patent No.: US 6,807,711 B2
(45) Date of Patent: Oct. 26, 2004

(54) ELASTIC HINGE FOR A NOTEBOOK COMPUTER

(75) Inventor: Sheng-Nan Lu, Taipei Hsien (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 84 days.

(21) Appl. No.: 10/245,358

(22) Filed: Sep. 17, 2002

(65) Prior Publication Data

US 2004/0049887 A1 Mar. 18, 2004

(51) Int. Cl.⁷ .............................. E05D 11/08; E05F 1/08
(52) U.S. Cl. ......................... 16/321; 16/286; 16/307; 16/308
(58) Field of Search .................. 16/281, 285–286, 16/304, 307–308, 321, 342; 403/83–86, 103–104, 106, 112

(56) References Cited

U.S. PATENT DOCUMENTS

| | | | | |
|---|---|---|---|---|
| 3,926,474 A | * | 12/1975 | Johndrow et al. | 16/307 |
| 4,428,095 A | * | 1/1984 | Takahashi | 16/307 |
| 4,485,522 A | * | 12/1984 | Chen | 16/307 |
| 5,037,231 A | * | 8/1991 | Kitamura | 16/307 |
| 5,041,818 A | * | 8/1991 | Liu | 16/307 |
| 5,771,539 A | * | 6/1998 | Wahlstedt et al. | 16/285 |
| 6,115,886 A | * | 9/2000 | Fujita | 16/330 |
| 6,460,220 B1 | * | 10/2002 | Jackson | 16/304 |
| 6,671,929 B1 | * | 1/2004 | Lu | 16/342 |
| 2001/0039694 A1 | * | 11/2001 | Cau | 16/285 |
| 2002/0133907 A1 | * | 9/2002 | Oshima et al. | 16/321 |

* cited by examiner

Primary Examiner—Daniel P. Stodola
Assistant Examiner—Christopher Boswell
(74) Attorney, Agent, or Firm—William E. Pelton, Esq.

(57) ABSTRACT

A hinge for a notebook computer is composed of a pintle, two barrels and a coil spring. The first barrel is provided outside the first part of the pintle, and the second barrel is provided outside the second part of the pintle. The coil spring has a central end secured on the pintle, and a free end secured on a monitor of the computer. When the computer is closed, the coil spring is compressed to provide an elastic force to automatically raise the monitor.

6 Claims, 6 Drawing Sheets

ELASTIC HINGE FOR A NOTEBOOK COMPUTER

BACKGROUND OF THE INVENTION

1. Field of the Invention

The present invention is related to an elastic hinge for a notebook computer, and more particularly to a hinge which has an elastic force to automatically open a monitor of the notebook computer.

2. Description of Related Art

A notebook computer comprises a body and a monitor pivotally mounted on the body by hinges. When the computer is closed, the monitor abuts the body and is fastened by a locking member.

However, the conventional hinge does not provide an elastic force to slightly raise the monitor when a user wants to open the computer, and the user may fumble in trying to separate the two hinged portions.

Therefore, the invention provides a hinge for a notebook computer to mitigate and/or obviate the aforementioned problems.

SUMMARY OF THE INVENTION

The main objective of the invention is to provide a hinge for a notebook computer which can provide an elastic force to slightly raise a monitor when a locking member of the computer is released.

Other objects, advantages and novel features of the invention will become more apparent from the following detailed description when taken in conjunction with the accompanying drawings.

DETAILED DESCRIPTION OF THE PREFERRED EMBODIMENT

Figure 1:
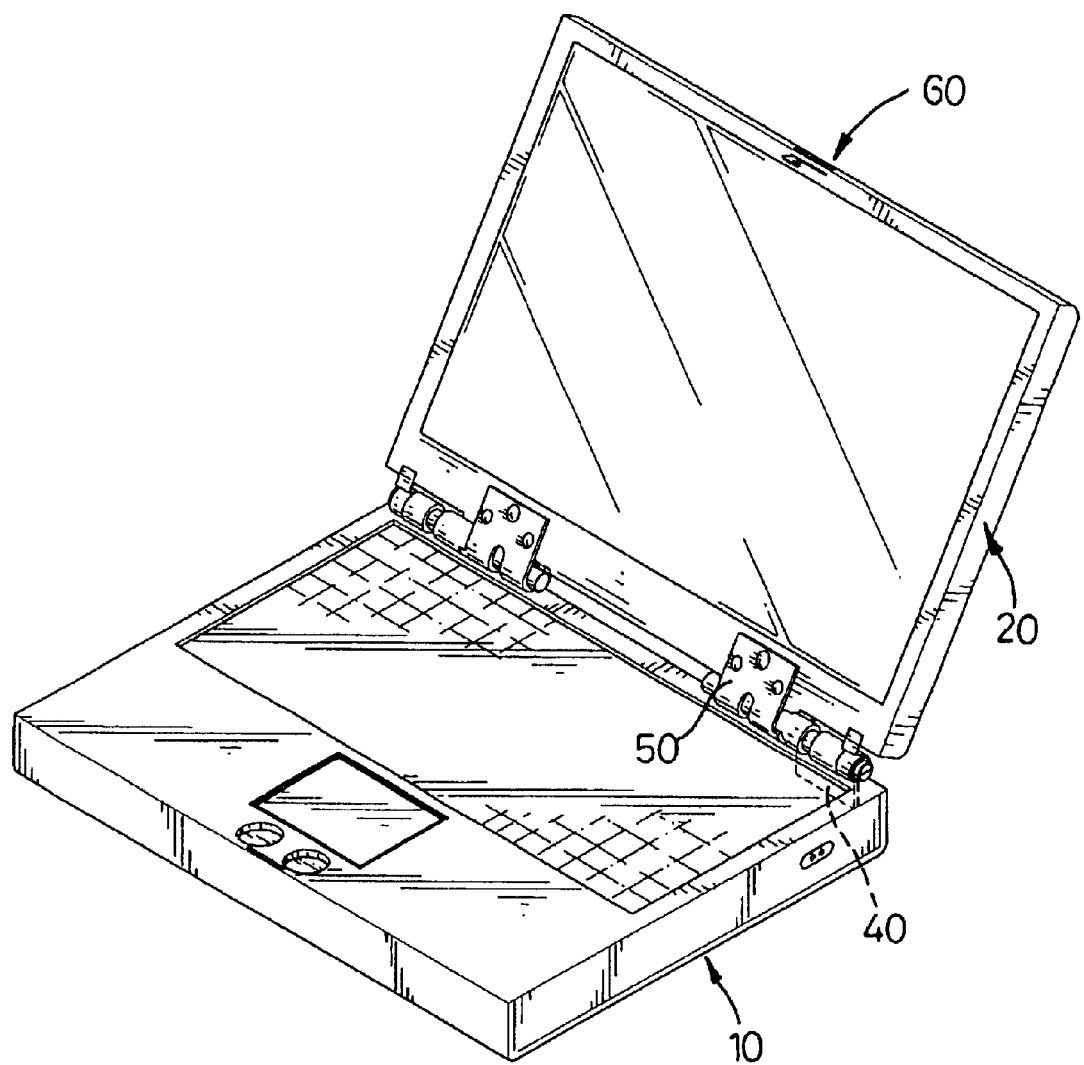
FIG. 1 is a perspective view of a notebook assembled with hinges in accordance with the invention.
Figure 2:
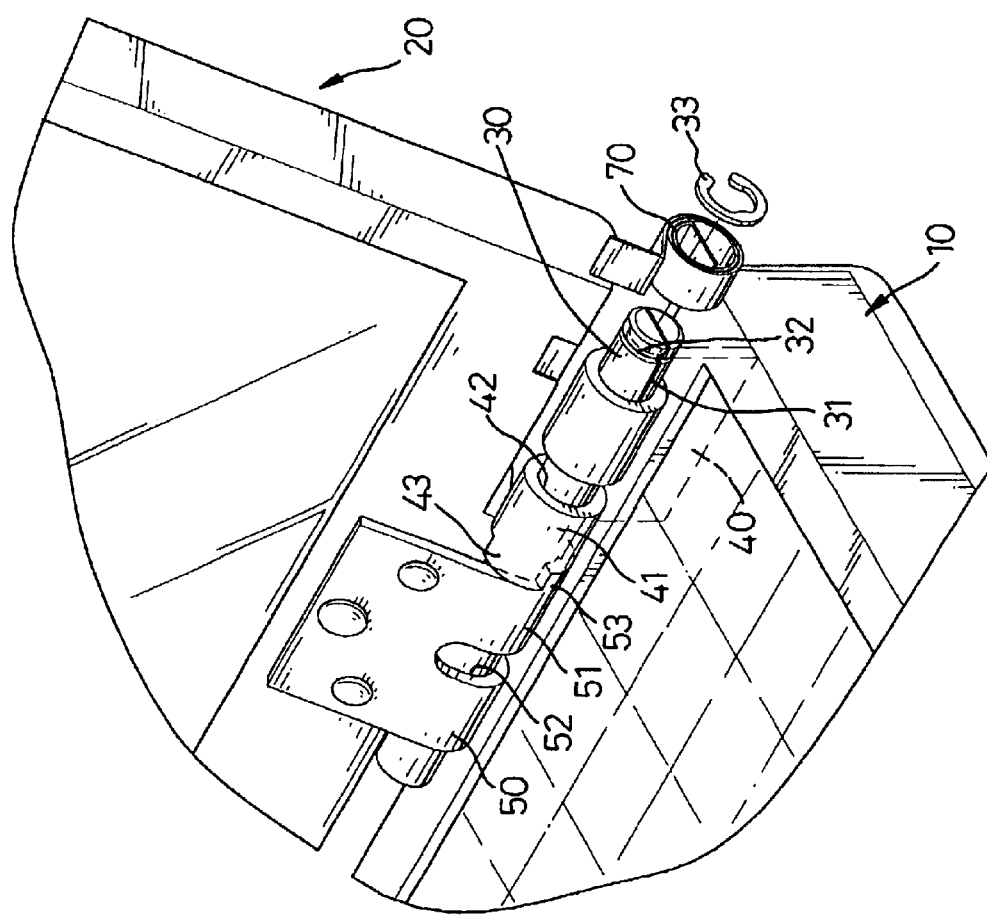
FIG. 2 is an exploded perspective view of the hinge in FIG. 1.
Figure 3:
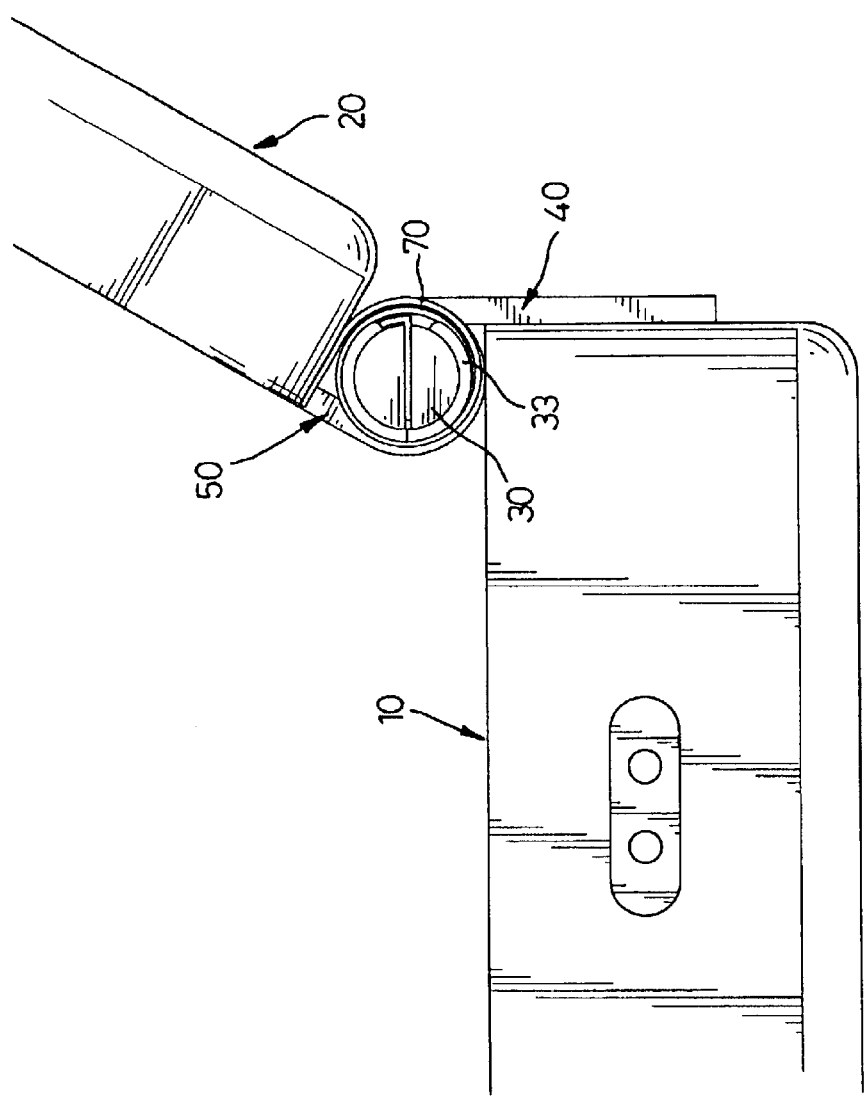
FIG. 3 is a side view showing the hinge in an open status.

Referring to FIGS. 1–3, a notebook computer is composed of a body (10) and a monitor (20) pivotally mounted on the body (10) by two hinges. The monitor (20) has a locking member (60) to fasten the monitor (20) on the body (10) when the computer is closed.

The elastic hinge in accordance with the invention is composed of a pintle (30), a first barrel (40), and a second barrel (50). The first barrel (40) is mounted on the body (10), and the second barrel (50) is mounted on the monitor (20).

The pintle (30) has a first part, a second part, a first end adjacent the first part, and a second end adjacent the second part. An elongated slot (31) is longitudinally defined in the first part, and a round slot (32) is circumferentially defined at the first end.

The first barrel (40) is securely provided outside the first part of the pintle (10), and has two first C-like tubular portions (41) aligned with each other, and each portion (41) has a first passage (42). The first barrel (40) has a first lug (43) formed at an end adjacent the second part of the pintle (30). The first barrel (40) further has a first plate (not numbered) extending therefrom and fastened on the body (10). The first end of the pintle (30) extends out from the first barrel (40).

The second barrel (50) is rotatably provided outside the second part of the pintle (10), and has two second C-like tubular portions (51) aligned with each other, and each portion (51) has a second passage (52). The second barrel (50) has a second lug (53) formed at an end adjacent the first part of the pintle (30) and abutting the first lug (43) when the monitor (20) is completely raised. The second barrel (50) further has a second plate (not numbered) extending therefrom and fastened on the monitor (20). The second end of the pintle (30) extends out from the second barrel (50).

A coil spring (70) with a central end and a free end is provided at the first end of the pintle (30), wherein the central end of the coil spring (70) is received in the elongated slot (31), and the free end of the coil spring (70) is attached on the monitor (20). A collar, such as a C-like clamp (33) is attached in the round slot (32) to secure the coil spring (70).

Figure 4:
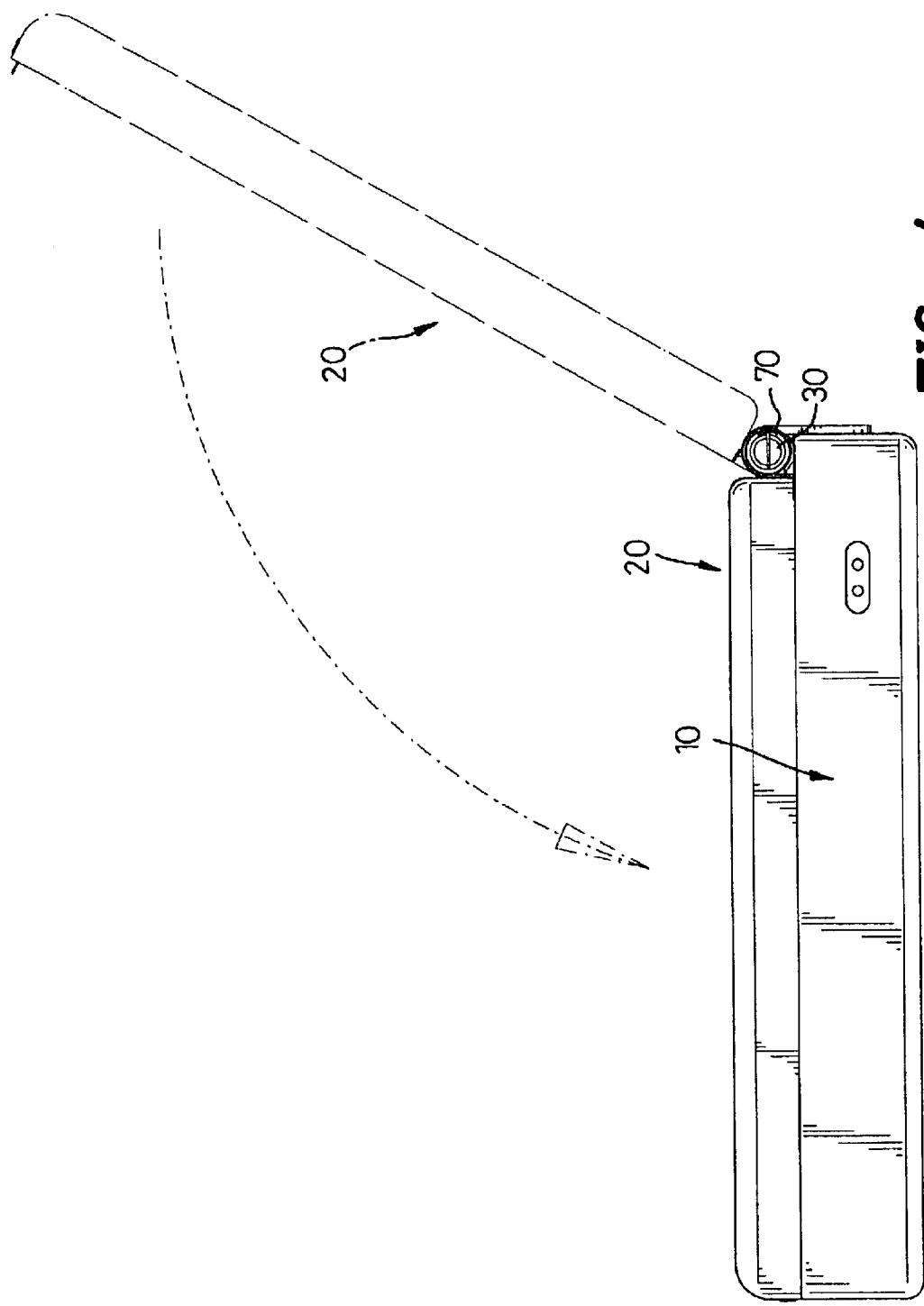
FIG. 4 is a side view showing the hinge from the open status to a closed status.
Figure 5:
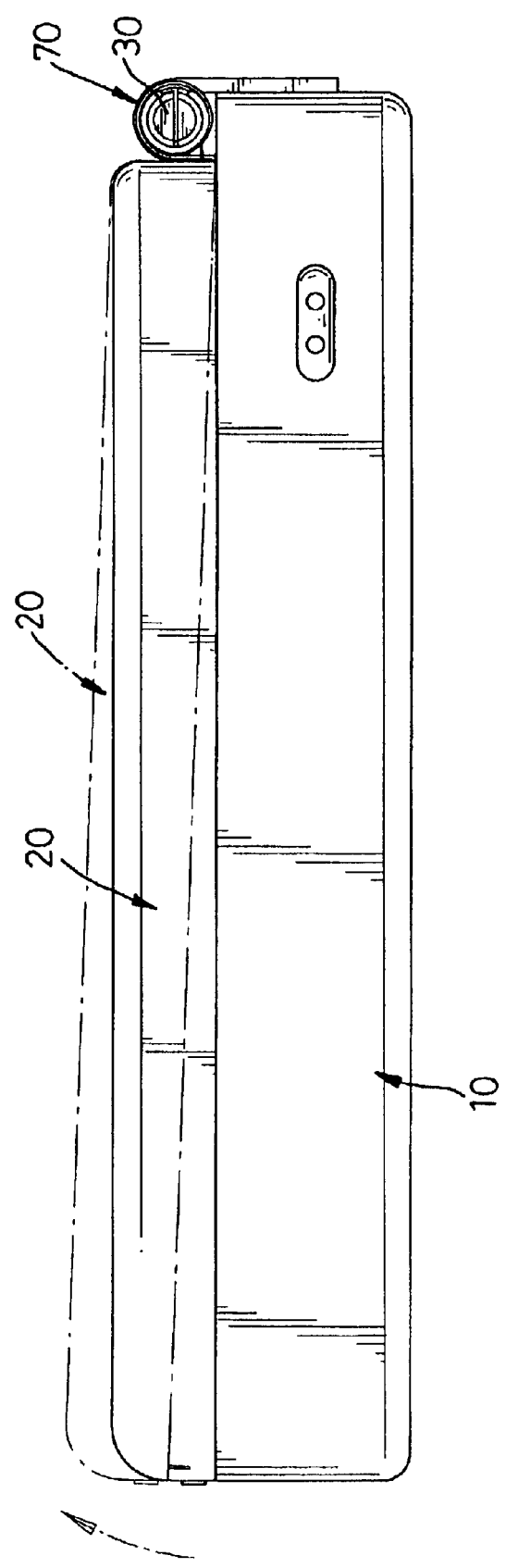
FIG. 5 is a side view operationally showing a monitor being automatically opened.

Referring to FIGS. 2, 4, and 5, when the monitor (20) is raised completely, the first lug (43) abuts the second lug (53), and the monitor (20) is positioned. When the monitor (20) is pivoted down to abut the body (10), the coil spring (70) is compressed, and the locking member (60) must be attached to the body (10) to close the computer.

When a user releases the locking member (60) to open the computer, the elastic force of the compressed coil spring (70) can slightly push the monitor (20) to pivot upwards, so that the user can easily and conveniently raise the monitor (20).

Certainly, the configuration that the first barrel (40) is rotatably provided outside the pintle (10), the second barrel (50) is securely provided outside the pintle (10), and the free end of the coil spring (70) is attached on the body (10) has the same function and effect, and will not depart from the scope of the invention.

Figure 6:
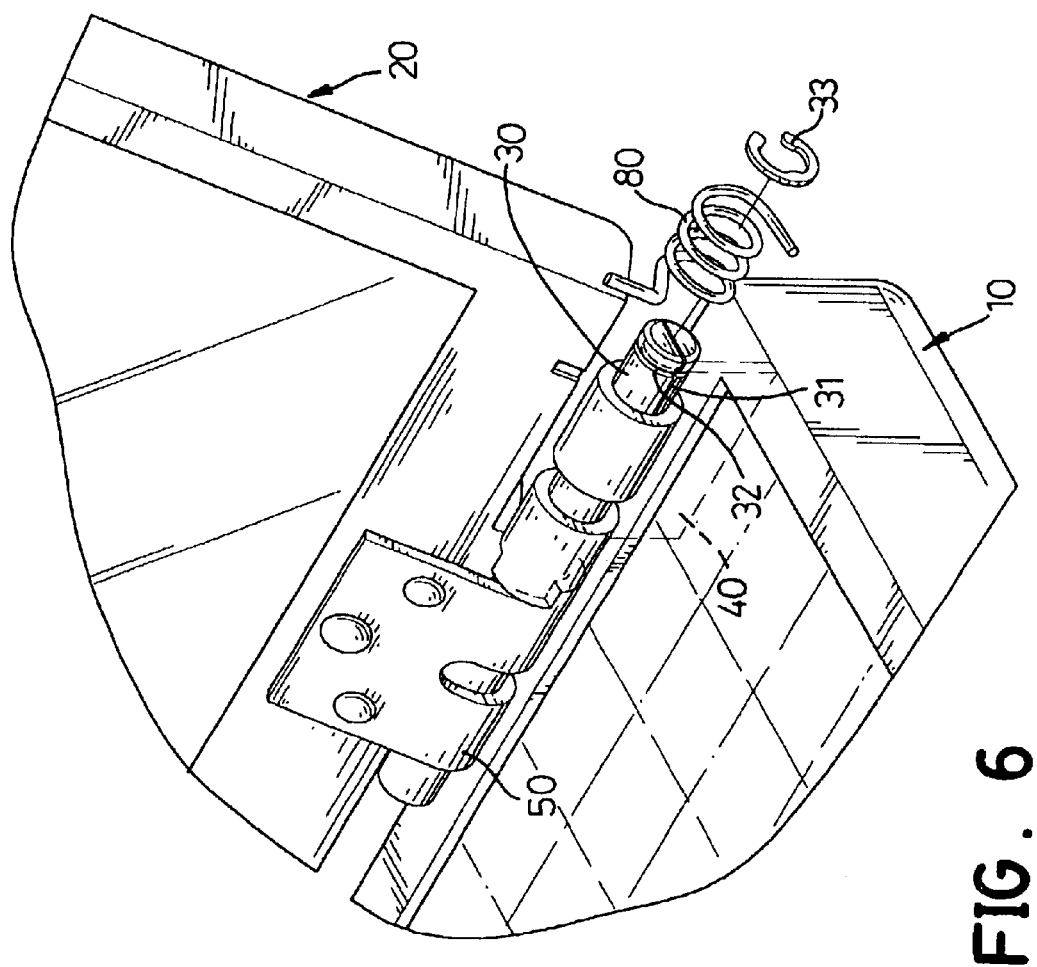
FIG. 6 is an exploded perspective view of another embodiment of the hinge.

Referring to FIG. 6, in another embodiment of the present invention, the coil spring is replaced with a torsional spring (80). The torsional spring (80) has a first end attached on the monitor (20), and a second end attached on the body (10). When the monitor (20) is pivoted downwards, the torsional spring (80) is compressed to provide an elastic force to automatically raise the monitor (20).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An elastic hinge for a notebook computer, the notebook computer having a body and a monitor, and the elastic hinge comprising:

a first barrel adapted to be attached to the body of the notebook computer and having at least one first tubular portion and a first lug, each of the at least one tubular portions having a first passage;

a second barrel adapted to be attached to the monitor of the notebook computer and having at least one second tubular portion and a second lug, each of the at least one tubular portions having a second passage aligned with the first passage of the at least one first tubular portions, the second lug corresponding to the first lug;

a pintle connecting the first barrel to the second barrel and having a first end and a second end, the second end traversing the first passage and extending into the second passage, the pintle being rotatably held in one of the first and the second passages; and a resilient member mounted on the pintle at the first end and having a first end adapted to abut the monitor;

wherein the resilient member is compressed when the monitor abuts the body, and the first lug and the second lug are engaged with each other when the monitor is raised completely to position the monitor.

2. The elastic hinge as claimed in claim 1, wherein the pintle has an elongated slot longitudinally defined at the first end, and the resilient member is a coil spring and further has a second end held in the elongated slot.

3. The elastic hinge as claimed in claim 2, wherein the pintle is partially fastened and held in the first passage in the first barrel and is rotatably held in the second passage in the second barrel.

4. The elastic hinge as claimed in claim 3, wherein the pintle has a round slot defined at the first end thereof, and a C-clamp is attached in the round slot to fasten the resilient member.

5. The elastic hinge as claimed in claim 1, wherein the resilient member is a torsional spring and further has a second end adapted to be attached to the body.

6. The elastic hinge as claimed in claim 5, wherein the pintle has a round slot defined at the first end thereof, and a C-clamp is attached in the round slot to fasten the resilient member.

* * * * *